(12) United States Patent
Chen et al.

(10) Patent No.: US 11,397,079 B2
(45) Date of Patent: Jul. 26, 2022

(54) ROTATABLE OPTICAL MODULE FOR PROJECTING STRUCTURED LIGHT AND ELECTRONIC DEVICE USING THE SAME

(71) Applicant: TRIPLE WIN TECHNOLOGY(SHENZHEN) CO. LTD., Shenzhen (CN)

(72) Inventors: Shin-Wen Chen, New Taipei (TW); Long-Fei Zhang, Guangdong (CN); Kun Li, Guangdong (CN); Ye-Quang Chen, New Taipei (TW); Xiao-Mei Ma, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 526 days.

(21) Appl. No.: 16/532,735

(22) Filed: Aug. 6, 2019

(65) Prior Publication Data

US 2021/0010806 A1     Jan. 14, 2021

(30) Foreign Application Priority Data

Jul. 8, 2019   (CN) .......................... 201910612082.8

(51) Int. Cl.
*G01B 11/25*     (2006.01)
*G02B 27/42*     (2006.01)

(52) U.S. Cl.
CPC ...... *G01B 11/2513* (2013.01); *G02B 27/4233* (2013.01)

(58) Field of Classification Search
CPC ........................... G02B 6/3564; G02B 6/3574
USPC ......................................................... 359/558
See application file for complete search history.

(56) References Cited

FOREIGN PATENT DOCUMENTS

| CN | 108333859 A | | 7/2018 |
|---|---|---|---|
| KR | 20170065061 A | * | 6/2017 |
| TW | 382453 | | 2/2000 |

* cited by examiner

*Primary Examiner* — Collin X Beatty
(74) *Attorney, Agent, or Firm* — ScienBiziP, P.C.

(57) ABSTRACT

A rotatable optical module able to aim structured light in different directions includes a driver and an optical assembly positioned at a side of the driver and connected to the driver. The optical assembly projects structured light. The driver drives the optical assembly to rotate, thereby changing the aiming direction of the structured light. An electronic device using such module and placed directly between two target objects is able to function as a meter of the distance between the objects in addition to mapping the contours of each.

18 Claims, 6 Drawing Sheets

ROTATABLE OPTICAL MODULE FOR PROJECTING STRUCTURED LIGHT AND ELECTRONIC DEVICE USING THE SAME

FIELD

The subject matter herein generally relates to 3D imaging.

BACKGROUND

Smart phones may have optical modules which can project structured light. The structured light can be used for quickly and accurately sensing and measuring the geometries of three-dimensional (3D) objects. To allow the electronic device to be capable of sensing the 3D objects at opposite sides of the electronic device, a front optical module and a back optical module are both needed. However, the two optical modules may increase the size of the electronic device and the assembly processes of the electronic device. Moreover, the cost may also be increased.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
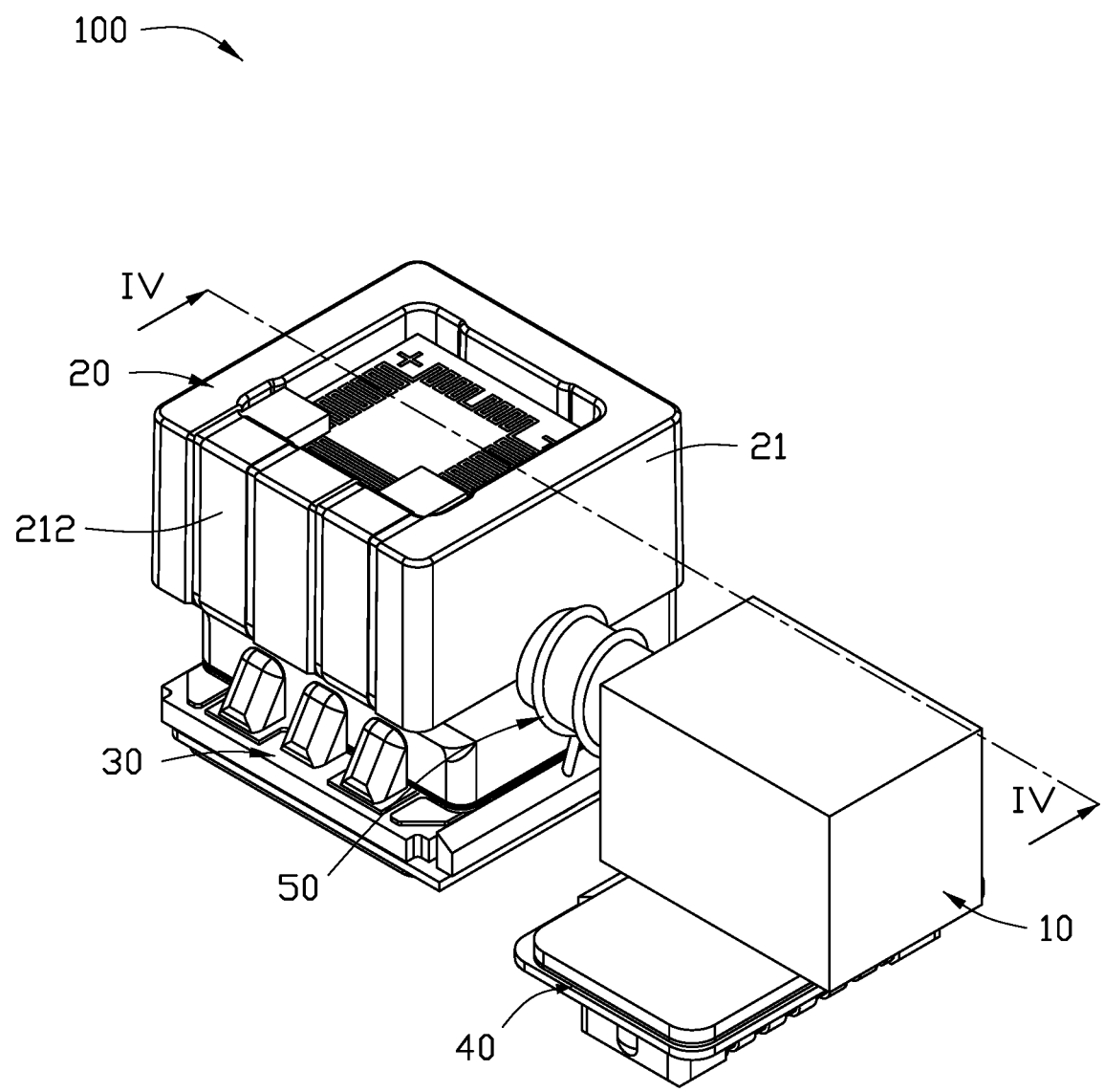
FIG. 1 is an isometric view of an embodiment of a rotatable optical module for projecting structured light according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
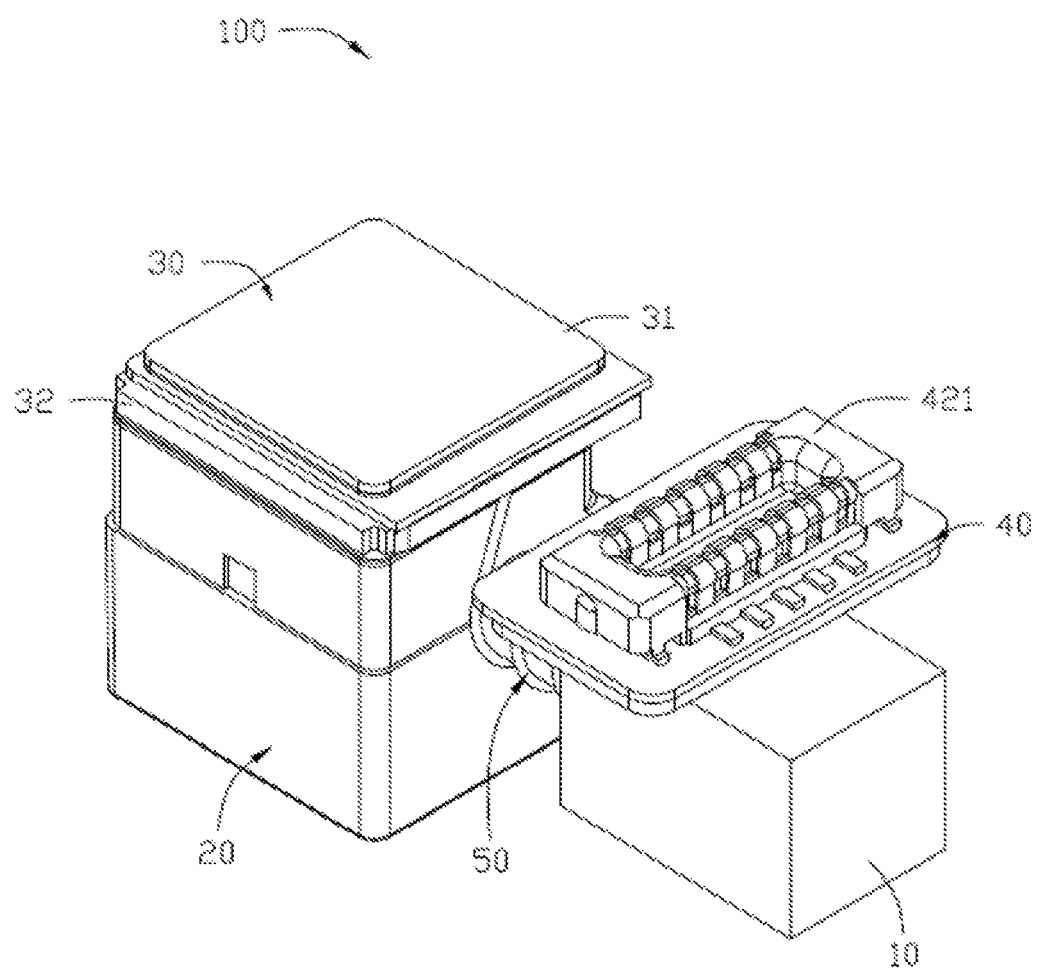
FIG. 2 is similar to FIG. 1, but showing the rotatable optical module from another angle.
Figure 3:
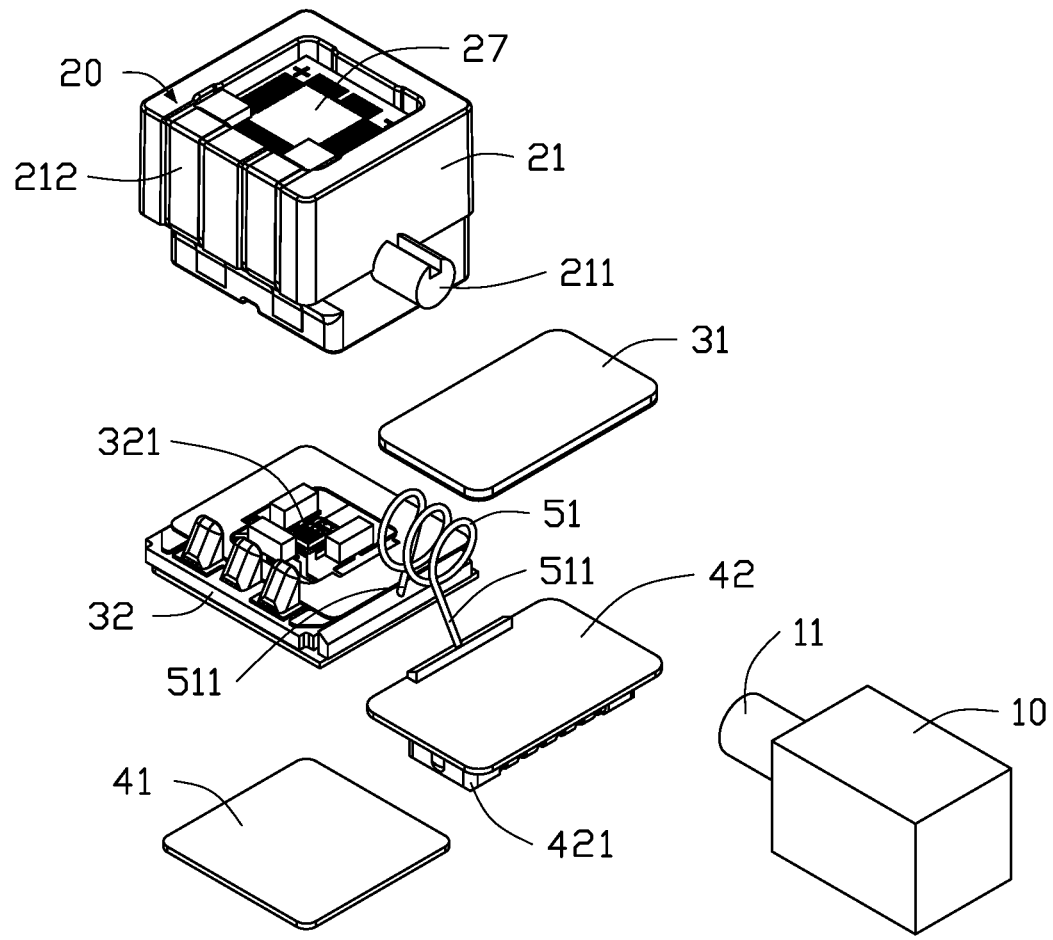
FIG. 3 is an exploded isometric view of the rotatable optical module of FIG. 1.

FIGS. 1 to 3 illustrate an embodiment of a rotatable optical module 100 for projecting structured light. The rotatable optical module 100 includes a driver 10 and an optical assembly 20 positioned at a side of the driver 10 and connected to the driver 10. The optical assembly 20 can project structured light. The driver 10 can drive the optical assembly 20 to rotate, thereby changing the direction of the structured light. Thus, the rotatable optical module 100 can project the structured light towards different directions.

In at least one embodiment, the optical assembly 20 includes a holder 21 which is substantially cubic. A protruding post 211 protrudes from a surface of the holder 21 facing the driver 10. The driver 10 includes a rotation shaft 11 which has an end surface 111 (see FIG. 4) facing the protruding post 211. A receiving groove 1111 is defined at the end surface 111. The protruding post 211 is fixedly received in the receiving groove 1111, thereby connecting the holder 21 to the driver 10. Thus, the rotation shaft 11 can drive the protruding post 211 to rotate, thus further rotating the optical assembly 10. The driver 10 can be a stepper motor or a servo motor.

Figure 4:
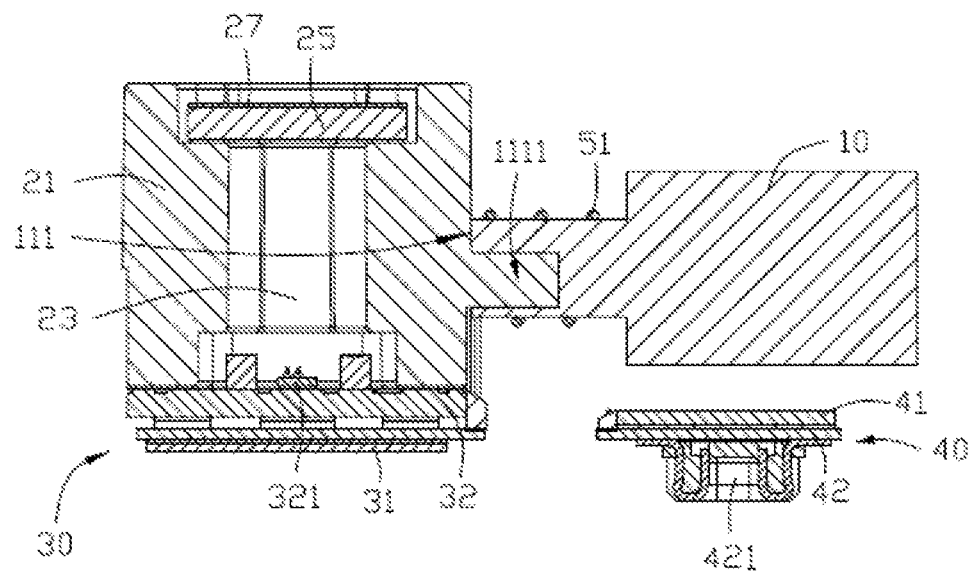
FIG. 4 is a cross-sectional view taken along line IV-IV of FIG. 1.

Referring to FIGS. 3 and 4, in at least one embodiment, the rotatable optical module 100 further includes a first board assembly 30 for supporting the holder 21. The first board assembly 30 includes a first support board 31 and a first circuit board 32 formed on the first support board 31. The holder 21 is formed on the first circuit board 32. The first circuit board 32 includes a laser source 321, a collimating lens 23, and a diffraction optical element (DOE) 25 arranged from image side to object side. The object side is defined as a side close to the objects to be sensed. The image side is another side opposite to the object side. The laser source 321 emits laser. The collimation lens 23 collimates the laser from the laser source 321. The DOE 25 diffracts the collimated laser from the collimation lens 23 to obtain the structured light. The laser source 321 can be a vertical cavity surface emitting laser (VCSEL) source or an edge-emitting laser (EEL) source.

In at least one embodiment, the optical assembly 20 further includes a transparent conductive film 25 formed on the DOE 25. The transparent conductive film 25 has a resistance value which changes with the intensity of the structured light. A conductive layer 212 is formed on the surface of the holder 21, and is electrically connected between the first circuit board 32 and the transparent conductive film 25. Thus, the transparent conductive film 25 can sense the intensity of the structured light according to the resistance value, and transmit the sensed intensity value to the first circuit board 32. Then, the first circuit board 32 can control the electric current supplied to the laser source 321, thereby adjusting the intensity of the structured light.

The rotatable optical module 100 can further include a second board assembly 40 and a connecting element 50 connected between the first board assembly 30 and the second board assembly 40. The second board assembly 40 includes a second support board 41 and a second circuit board 42 formed on the second support board 41. The driver 10 is formed on the second support board 41. The second circuit board 42 includes a connector 421 for connecting the rotatable optical module 100 to peripheral electronic components (not shown). The connecting element 50 includes at least one conductive wire 51. The conductive wire 51 has two opposite end portions 511 connecting the first circuit board 32 and the second circuit board 42. The remaining portion of the conductive wire 51 wraps around the rotation shaft 11, thereby preventing the conductive wire 51 from being tangled when the optical assembly 20 rotates with respect to the driver 10. The first support board 31 and the second support board 41 can support the first circuit board 32 and the second circuit board 42, respectively, to improve the bending resistances of the first circuit board 32 and the second circuit board 42. The first support board 31 and the second support board 41 can be made of plastic such as polyethylene glycol terephthalate (PET), polymethyl methacrylate (PMMA), polycarbonate (PC), or polyimide (PI). The first support board 31 and the second support board 41 can also be made of metal such as iron or aluminum. Each of the first circuit board 32 and the second circuit board 42 can be a ceramic circuit board.

Figure 5:
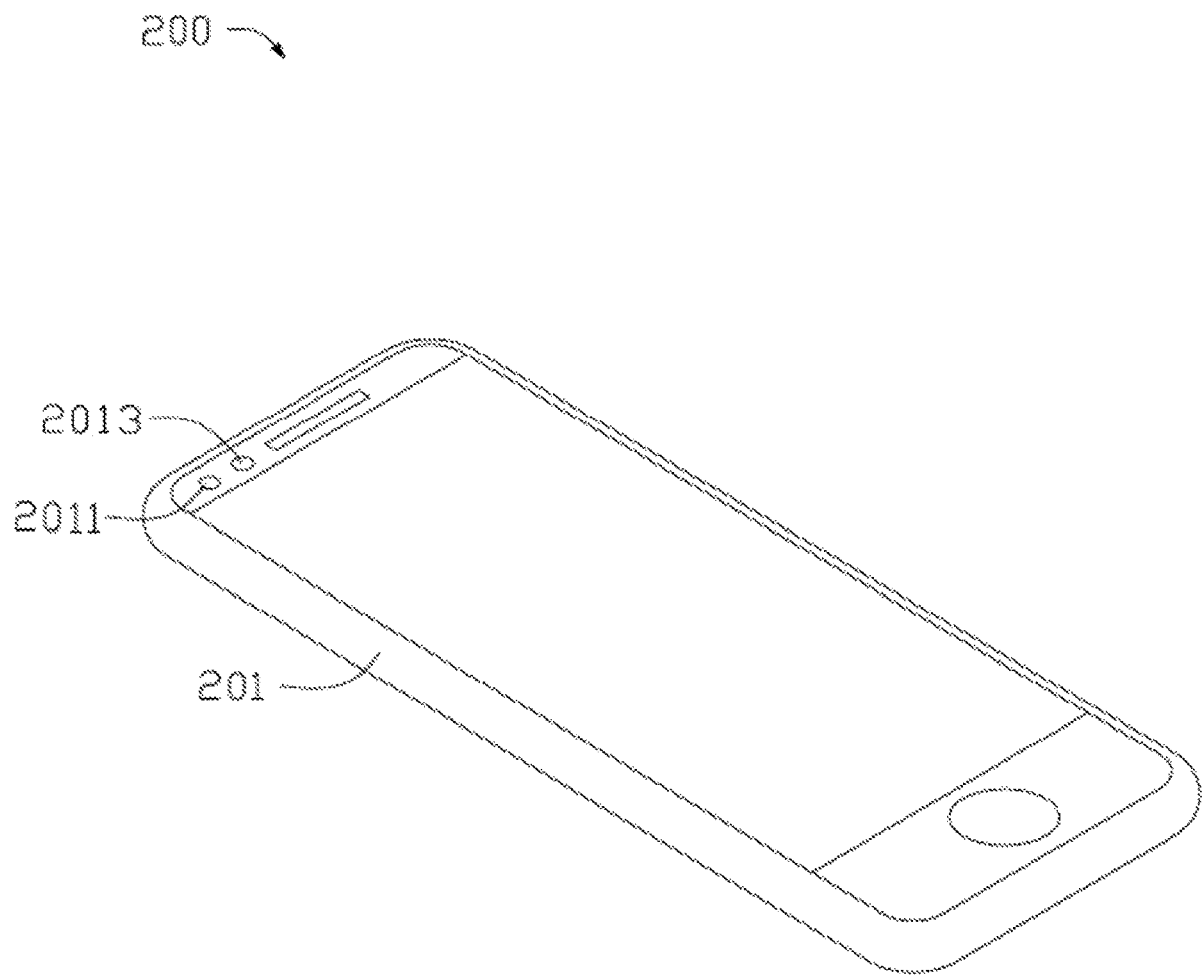
FIG. 5 is an isometric view of an embodiment of an electronic device.
Figure 6:
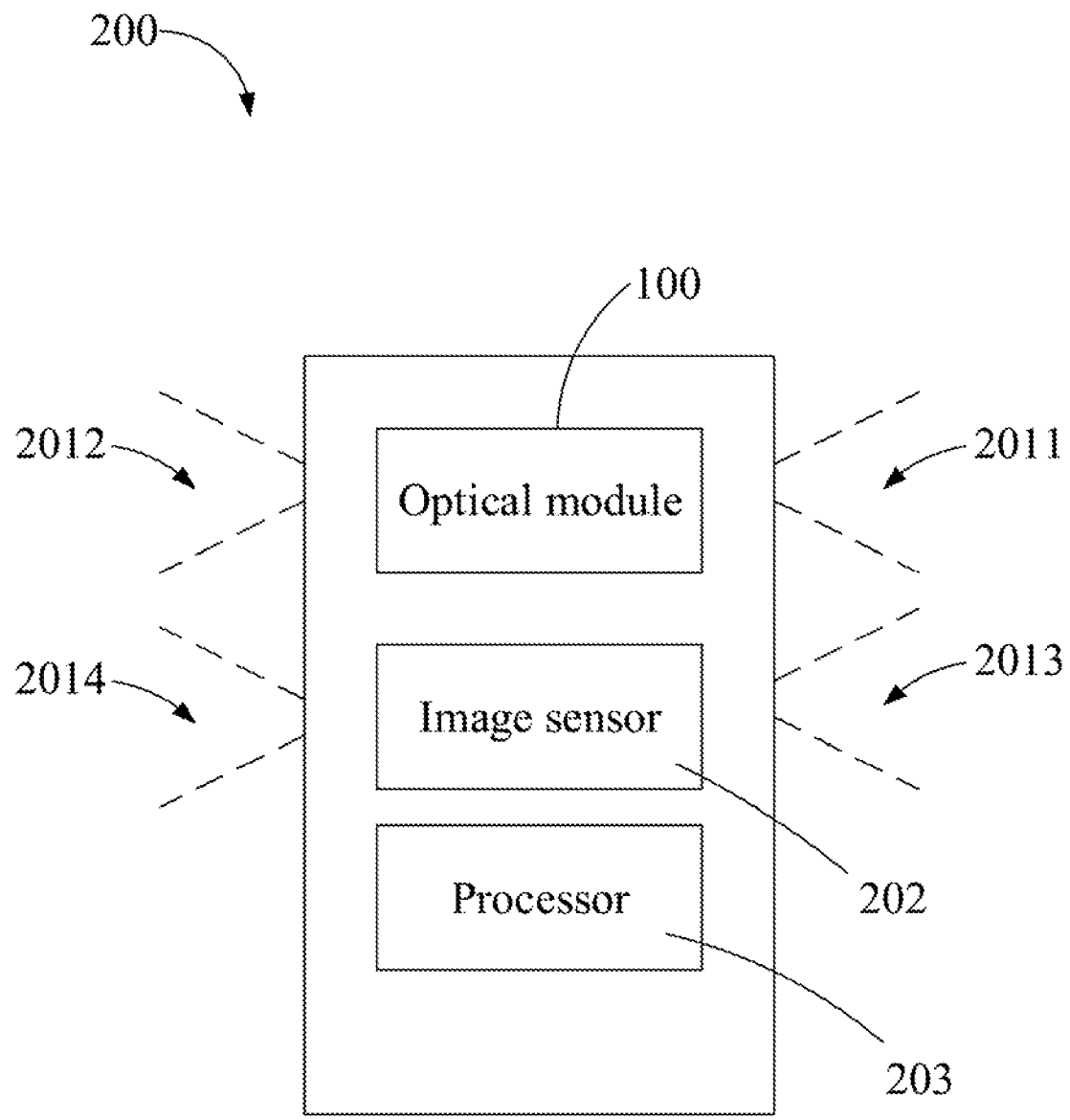
FIG. 6 is a block diagram of the electronic device of FIG. 5.

Referring to FIGS. 5 and 6, the present disclosure further provides an electronic device 200 including the rotatable optical module 100. The electronic device 200 further includes a casing 201 for receiving the rotatable optical module 100. The casing 201 defines a first projection opening 2011 and a second projection opening 2012 at opposite sides of the casing 201. The rotatable optical module 100 can change the aiming direction of the structured light towards the first projection opening 2011 and the second projection opening 2012, thus, the electronic device 200 can sense objects (not shown) at opposite sides of the casing 201. A second rotatable optical module 100 is not required. Thus, the total size and the cost of the electronic device 200 can be reduced. The electronic device 200 has a simplified structure.

The electronic device 200 can also include an image sensor 202 and a processor 203. The casing 201 further defines a first collecting opening 2013 and a second collecting opening 2014 adjacent to the first projection opening 2011 and the second projection opening 2012, respectively. The image sensor 202 collects the light reflected by target objects through the first collecting opening 2013 and the second collecting opening 2014. The processor 203 can determine the geometrical information of the objects according to the light patterns collected from the image sensor 202.

In at least one embodiment, the image sensor 202 can be an infrared sensor.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A rotatable optical module comprising:
a driver; and
an optical assembly positioned at a side of the driver and connected to the driver, the optical assembly being configured to project structured light, the driver being configured to drive the optical assembly to rotate, thereby changing direction of the structured light, wherein the optical assembly comprises a holder, a protruding post protrudes from a surface of the holder facing the driver, the driver comprises a rotation shaft which has an end surface facing the protruding post, a receiving groove is defined on the end surface, and the protruding post is fixedly received in the receiving groove, thereby connecting the holder to the driver.

2. The rotatable optical module of claim 1, wherein the rotatable optical module further comprises a first board assembly configured for supporting the holder.

3. The rotatable optical module of claim 2, wherein the first board assembly comprises a first support board and a first circuit board formed on the first support board, the holder is formed on the first circuit board, and the first circuit board comprises a laser source for emitting laser.

4. The rotatable optical module of claim 3, wherein the first circuit board further comprises a collimating lens and a diffraction optical element, the laser source, the collimating lens, and the diffraction optical element are arranged from image side to object side, the collimation lens collimates the laser from the laser source, and the diffraction optical element diffracts the collimated laser from the collimation lens to obtain the structured light.

5. The rotatable optical module of claim 4, wherein the optical assembly further comprises a transparent conductive film formed on the diffraction optical element, the transparent conductive film has a resistance value which changes with an intensity of the structured light, and a conductive layer is formed on the surface of the holder, and is electrically connected between the first circuit board and the transparent conductive film.

6. The rotatable optical module of claim 3, wherein the rotatable optical module further comprises a second board assembly configured for supporting the driver.

7. The rotatable optical module of claim 6, wherein the second board assembly comprises a second support board and a second circuit board formed on the second support board, and the driver is formed on the second support board.

8. The rotatable optical module of claim 7, wherein the rotatable optical module further comprises a connecting element connected between the first board assembly and the second board assembly, the connecting element includes at least one conductive wire, and the conductive wire comprises two opposite end portions respectively connecting the first circuit board and the second circuit board.

9. The rotatable optical module of claim 8, wherein a remaining portion of the conductive wire besides the two end portions wraps around the rotation shaft.

10. An electronic device comprising:
a casing defining a first projection opening and a second projection opening at opposite sides of the casing; and
a rotatable optical module received in the casing, the rotatable optical module comprising:
a driver; and
an optical assembly positioned at a side of the driver and connected to the driver, the optical assembly being configured to project structured light, the driver being configured to drive the optical assembly to rotate, thereby changing direction of the structured light towards the first projection opening and the second projection opening, wherein the optical assembly comprises a holder, a protruding post protrudes from a surface of the holder facing the driver, the driver comprises a rotation shaft which has an end surface facing the protruding post, a receiving groove is defined on the end surface, and the protruding post is fixedly received in the receiving groove, thereby connecting the holder to the driver.

11. The electronic device of claim 10, wherein the rotatable optical module further comprises a first board assembly configured for supporting the holder.

12. The electronic device of claim 11, wherein the first board assembly comprises a first support board and a first circuit board formed on the first support board, the holder is formed on the first circuit board, and the first circuit board comprises a laser source for emitting laser.

13. The electronic device of claim 12, wherein the first circuit board further comprises a collimating lens and a diffraction optical element, the laser source, the collimating lens, and the diffraction optical element are arranged from image side to object side, the collimation lens collimates the laser from the laser source, and the diffraction optical element diffracts the collimated laser from the collimation lens to obtain the structured light.

14. The electronic device of claim 13, wherein the optical assembly further comprises a transparent conductive film formed on the diffraction optical element, the transparent conductive film has a resistance value which changes with an intensity of the structured light, and a conductive layer is formed on the surface of the holder, and is electrically connected between the first circuit board and the transparent conductive film.

15. The electronic device of claim 12, wherein the rotatable optical module further comprises a second board assembly configured for supporting the driver.

16. The electronic device of claim 15, wherein the second board assembly comprises a second support board and a second circuit board formed on the second support board, and the driver is formed on the second support board.

17. The electronic device of claim 16, wherein the rotatable optical module further comprises a connecting element connected between the first board assembly and the second board assembly, the connecting element comprises at least one conductive wire, and the conductive wire comprises two opposite end portions respectively connecting the first circuit board and the second circuit board.

18. The electronic device of claim 17, wherein a remaining portion of the conductive wire besides the two end portions wraps around the rotation shaft.

* * * * *